A. C. GARRATT.
Axle-Lubricator.
No. 12,238. 
Patented Jan. 16, 1855.
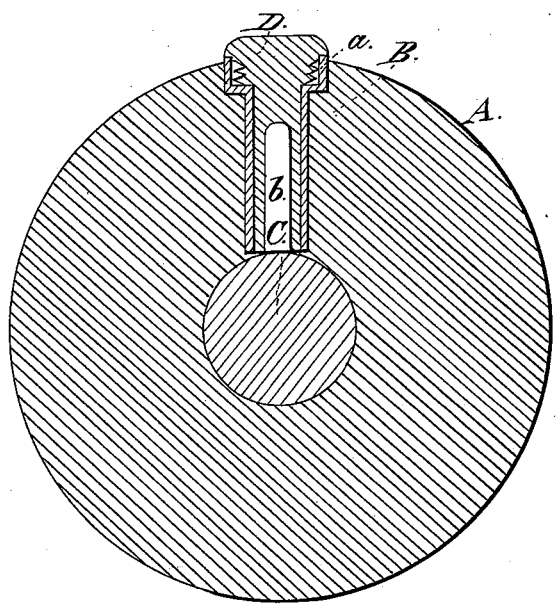
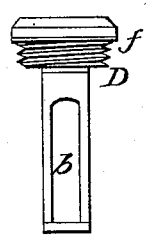
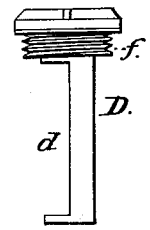

UNITED STATES PATENT OFFICE.

ALFRED C. GARRATT, OF HANOVER, MASSACHUSETTS.

PLUG FOR LUBRICATING AXLES.

Specification of Letters Patent No. 12,238, dated January 16, 1855.

*To all whom it may concern:*

Be it known that I, ALFRED C. GARRATT, of Hanover, in the county of Plymouth and State of Massachusetts, have made a new and useful Invention for Facilitating the Work of Lubricating the Axles or Bearings of Carriage-Wheels; and I do hereby declare that the same is fully described and represented in the following specification and the accompanying drawings, letters, figures, and references thereof.

Of the said drawings Figure 1 represents a vertical and transverse section of the hub of a wheel and a journal of its axle, the same exhibiting my improvement as applied thereto. Figs. 2 and 3, are separate side views of the screw plug to be hereinafter described.

In carrying out my invention, I insert in the hub A, a tube B, which I cause to extend nearly or quite down to the journal C. This tube is provided with a mouth and a female screw as seen at *a*. Into this tube I insert a round plug of metal D, which I cause to extend down or nearly down to journal C. Within this plug I bore or make in the direction of its axis a chamber *b*, and I also cut away the plug so as to form an opening out of the side of said chamber as seen at *d*. The plug so made is to be provided with a male screw as seen at *f*, adapted to screw into the female screw hereinbefore mentioned.

By extending the plug entirely down through the hub and to the journal of an axle and providing it with a chamber as above described I am enabled to accomplish a very important advantage in the removal of wheel grease and to keep the socket tube into which the plug is inserted always open and clear for the passage of oil into the hub of the wheel.

When the plug is made with a chamber within it and a cavity or passage *d*, opening through one side of it wheel grease collects within the said chamber, and may be drawn out of it with the screw plug, from which it may readily be removed through the opening *d*.

When oil has been inserted in the hub through its side, the oil passage has generally been provided with a simple screw nut or plug made to close its outer end. In this case the wheel grease would soon accumulate within the oil passage and fill it up so as to render it difficult if not impossible to cause oil to pass through it; my improvement obviates the above difficulty.

What therefore I claim as my invention is—

The chambered screw plug open at its lower end and having a passage made through its side and applied for removing the accumulated wheel grease as described.

In testimony whereof I have hereunto set my signature this eleventh day of August A. D. 1854.

ALFRED C. GARRATT.

Witnesses:
 WM. R. CHAPMAN,
 SAML. TOLMAN.